US005984590A

United States Patent [19]

Church, II et al.

[11] Patent Number: 5,984,590

[45] Date of Patent: Nov. 16, 1999

[54] COLLECTOR BOX WITH BAFFLE SYSTEM FOR USE IN SPRAY-ON FIBER RECYCLING SYSTEM

[75] Inventors: Joseph Thomas Church, II, Collierville, Tenn.; C. E. Butch Lytle, Oklahoma City, Okla.

[73] Assignee: Guardian Fiberglass, Inc., Albion, Mich.

[21] Appl. No.: 08/871,407

[22] Filed: Jun. 9, 1997

Related U.S. Application Data

[63] Continuation of application No. 08/805,729, Feb. 25, 1997.

[51] Int. Cl.[6] .................... B65G 53/40

[52] U.S. Cl. .................... 406/48; 406/39; 406/65; 406/109; 406/163; 406/171

[58] Field of Search .................... 406/39, 47, 48, 406/65, 109, 124, 151, 152, 153, 163, 171, 172

[56] References Cited

U.S. PATENT DOCUMENTS

| | | | |
|---|---|---|---|
| 2,889,083 | 6/1959 | Schwindhorst | 406/61 |
| 2,890,079 | 6/1959 | Stumpf | 406/67 |
| 3,210,127 | 10/1965 | Schaben et al. | 406/65 |
| 3,529,870 | 9/1970 | Woten | 406/53 |
| 3,861,599 | 1/1975 | Waggoner | 239/654 |
| 3,995,775 | 12/1976 | Birkmeier et al. | 406/96 |
| 4,129,338 | 12/1978 | Mudgett | 406/135 |
| 4,411,390 | 10/1983 | Woten | 241/98 |
| 4,465,239 | 8/1984 | Woten | 241/98 |
| 4,673,594 | 6/1987 | Smith | 427/196 |
| 4,712,347 | 12/1987 | Spencer | 52/404.1 |
| 4,773,960 | 9/1988 | Vincelli et al. | 156/357 |
| 4,947,903 | 8/1990 | Beckwith | 406/171 X |
| 5,114,281 | 5/1992 | Hartnett et al. | 406/39 |
| 5,389,167 | 2/1995 | Sperber | 156/71 |
| 5,393,794 | 2/1995 | Sperber | 521/78 |
| 5,403,128 | 4/1995 | Thomas | 406/39 |
| 5,421,922 | 6/1995 | Sperber | 156/71 |
| 5,507,869 | 4/1996 | Nyberg et al. | 118/308 |
| 5,590,984 | 1/1997 | Assarsson | 406/32 |
| 5,788,163 | 8/1998 | Woten et al. | 406/52 X |

OTHER PUBLICATIONS

"Multi–Matic" Unisul's wall spray system, 1996.

*Primary Examiner*—Andrew C. Pike
*Attorney, Agent, or Firm*—Hall, Priddy & Myers

[57] ABSTRACT

A system for recovering waste fiber and reusing it with a loose-fill blown-in-place insulation system includes a fiber collector device mounted above the feed hopper, which collector receives the waste (i.e. recovered) insulation for recycling into the blowing operation. The collector includes a unique set of angled baffles which serve to thoroughly redistribute the recovered waste fibers back into the feed hopper for more even and uniform mixing with the new, virgin fibers being added. To accomplish this distribution the baffles are located so as to increase in surface area as a function of increased distance from the inlet.

11 Claims, 8 Drawing Sheets

COLLECTOR BOX WITH BAFFLE SYSTEM FOR USE IN SPRAY-ON FIBER RECYCLING SYSTEM

RELATED APPLICATION

This application is a continuation-in-part of application Ser. No. 08/805,729 filed Feb. 25, 1997.

This invention relates to an insulation blowing or spraying system and corresponding method, including a collector box for use in a fiber recycling subsystem. More particularly, this invention relates to an insulation blowing system, and corresponding method, including a collector box for recovering or recycling waste fibers and reintroducing them back into the system, the collector box including a unique baffle system which functions to redistribute the recycled fibers as they are forwarded to the hopper.

BACKGROUND OF THE INVENTION

Blown insulation is commonly used in the construction industry for insulating dwelling walls, floors, and attics. Insulation fibers such as fiberglass, rock wool, and cellulose are blown into cavities or compartments in building structures (both commercial and residential) to provide thermal and/or acoustic insulation.

Systems and methods for blowing/spraying insulation are old and well known throughout the art. For example, see U.S. Pat. Nos. 5,590,984; 5,403,128; 5,389,167; 4,773,960; 5,421,922; 5,393,794; 4,673,594; 4,712,347; 4,411,390; 3,995,775; and 3,861,599. Certain prior art systems blow insulation into closed cavities (e.g., U.S. Pat. No. 4,712,347) or attics while others spray or blow the loose-fill insulation together with adhesive into vertically extending open wall cavities so that a substantial amount of the insulation is retained therein.

However, a problem that exists in systems that spray/blow insulation into vertically extending open wall cavities is that a certain amount of the sprayed insulation (e.g., oversprayed portions that are shaved off, or portions that are simply not retained in the open cavities between respective wall studs) falls to the floor in front of or proximate the cavity(ies) being insulated. This excess insulation that falls to the floor may represent from about 10–30% of the insulation sprayed in certain instances. Often, the insulation that falls to the floor in residential environments is gathered up by shovel and reintroduced into the spraying process at the hopper. This method of recycling waste or overspray fiber is burdensome, time consuming, and labor intensive.

U.S. Pat. No. 5,403,128 discloses an insulation recovery system including a vacuum and corresponding return hose for vacuuming up overspray insulation from the floor and conveying same to a vehicle-mounted cyclone separator. The cyclone separator separates much of the recovered insulation from the recovery airstream and forwards it to a standby chamber, from which an auxiliary airlock meters the recycled fibers back into the main airstream where the recycled fibers intermix with virgin fibers being forwarded from the main hopper.

Unfortunately, the system of U.S. Pat. No. 5,403,128 has a number of drawbacks which generally result from the system having been overengineered and having probably been designed mainly for cellulose spraying, although fiberglass and rock wool are mentioned. For example, the system of the ’128 patent includes: (i) two separate chambers/hoppers, one for virgin fibers and one standby for recycled fibers; (ii) two separate airlocks, one for virgin fibers and one associated with a standby chamber for recycled fibers, (iii) a cyclone separator, (iv) multiple rooms or compartments, and (v) the space and power needed for same. This system is overly complicated and would be very expensive for typical residential use. Furthermore, while the system of the ’128 patent may be excellent for spraying wet, highly saturated, cellulose insulation, many of the system’s components that are advantageous, or even believed to be needed, for wet spray cellulose applications, may be burdensome for wet spray fiberglass or plastic fiber applications. Cellulose and fiberglass are different animals with completely different characteristics.

Another commercially available prior art system designed especially for spraying wet cellulose insulation into wall cavities is the Unisul Multi-Matic System. The Multi-Matic includes a vacuum system that recovers excess insulation and returns it to an auxiliary holding hopper, from which it is metered into new virgin fiber being forwarded from the main hopper. Again, it has been found that the Multi-Matic, which is excellent for use in cellulose applications where the recovered fibers are highly saturated, is overengineered, and not nearly as efficient when it comes to spraying fiberglass where there is less saturation of the fibers and sometimes a lesser amount of liquid spray utilized. It has been found that the two hoppers and complex metering system of the Multi-Matic are burdensome and overly expensive.

Regarding the disclosure of Ser. No. 08/805,729, the collector box disclosed therein works well in the field. However, the instant inventors have found that there was room for improvement regarding the issue of fiber distribution within and from the box. The instant invention has been found, surprisingly, to redistribute the fibers to a greater degree (more evenly and uniform) within the collector box and above the hopper.

It is apparent from the above that there exists a need in the art for an improved insulation recycling spraying system, and corresponding method, that results in improved distribution of the recycled fibers within the collector box and as falling toward the hopper therefrom.

It is a purpose of this invention to fulfill the above-described needs in the art, as well as other needs which will become apparent to the skilled artisan from the following detailed description of certain embodiments of this invention.

SUMMARY OF THE INVENTION

Generally speaking, this invention fulfills the above-described needs in the art by providing a collector device for use in conjunction with a waste fiber recycling system. The collector device comprises the following elements:

(1) substantially continuous sidewall means defining and laterally surrounding an interior fiber recovery cavity;

(2) fiber inlet means defined in the sidewall means for receiving recovered insulation fibers from a return and allowing the recovered fibers to flow into the cavity;

(3) a top wall disposed adjacent an upper edge of the sidewall means, the top wall including aperture means defined therein for enabling air flowing from the return hose into the cavity to at least partially exhaust upward through the aperture means;

(4) a plurality of baffles mounted to the device and extending across the cavity at different locations for more evenly and uniformly distributing the recovered fibers downward toward a hopper after the recovered fibers enter the cavity through the inlet means; and (5) outlet means located proximate a bottom of the device for allowing recovered uniformly distributed fibers to fall from the cavity downward toward and into the hopper where the recovered fibers can intermix with virgin fibers. Moreover, in this device the baffles increase in surface area as a function of increased distance from the inlet means so that baffles further from the inlet means define more surface area than baffles closer to the inlet means.

This invention further fulfills the above-described needs in the art by providing a collector means for use in conjunction with a fiber recycling system. The collector means in this situation includes a housing and a plurality of fiber distributing baffles mounted therein. The collector means is mounted at an elevation vertically above the hopper for receiving waste fibers from a fiber recovery means and distributing the waste fibers back into the hopper so that the waste fibers fall from the collector means back into the hopper. In such a collector the plurality of baffles are of different sizes and are inclined relative to the vertical so as to more evenly and uniformly distribute the waste fibers back into the hopper.

This invention will now be described with respect to certain embodiments thereof, accompanied by certain illustrations, wherein:

IN THE DRAWINGS

DETAILED DESCRIPTION OF CERTAIN EMBODIMENTS OF THIS INVENTION

Figure 1:
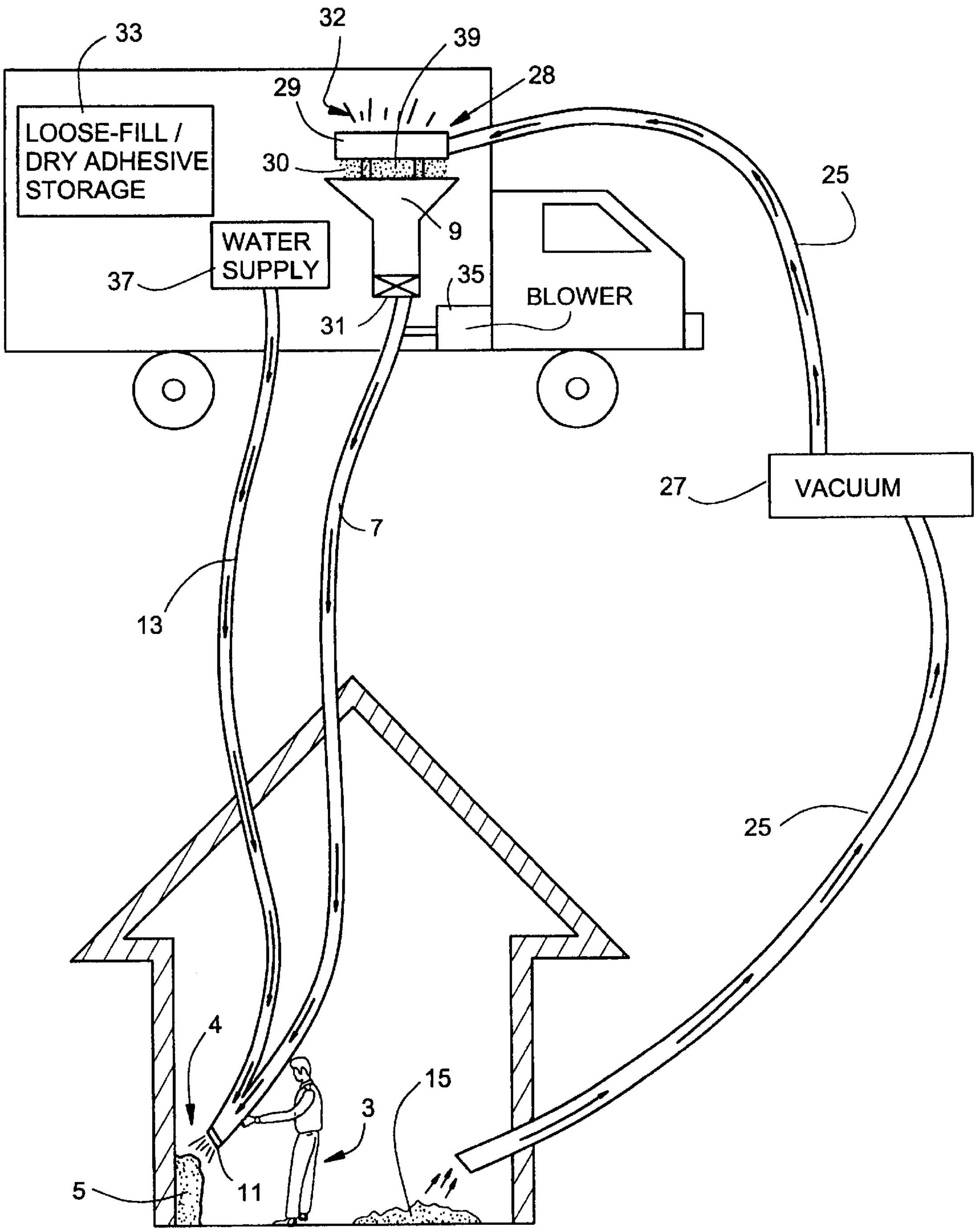
FIG. 1 is a schematic illustrating an insulation blowing/spraying system, the system including a fiber recovery or recycling subsystem.

Reference is now made to the accompanying drawings in which like reference numerals indicate like parts throughout the several views.

Figure 2:
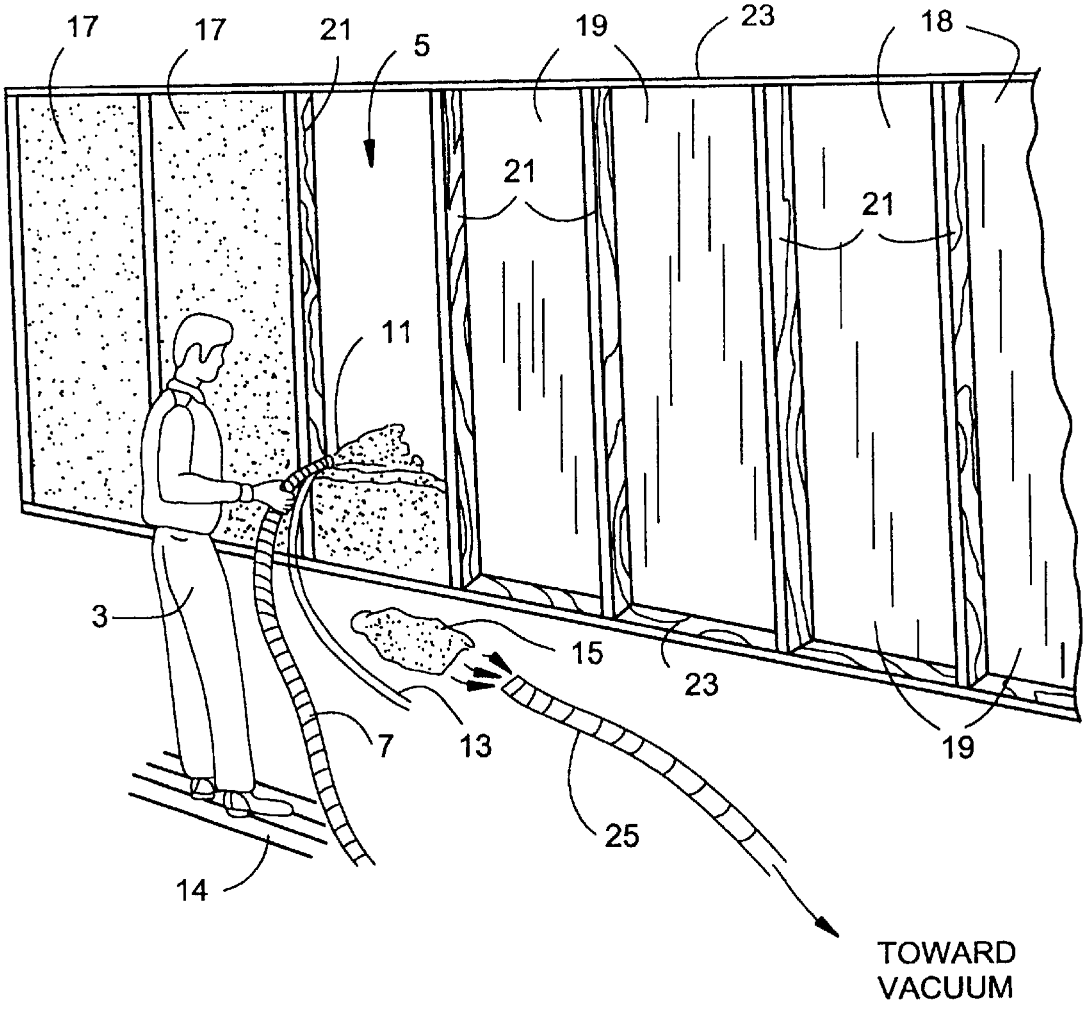
FIG. 2 is a perspective view illustrating a user blowing a loose-fill insulation/dry adhesive mixture together with an adhesive activating liquid into a vertically extending residential open wall cavity.
Figure 7:
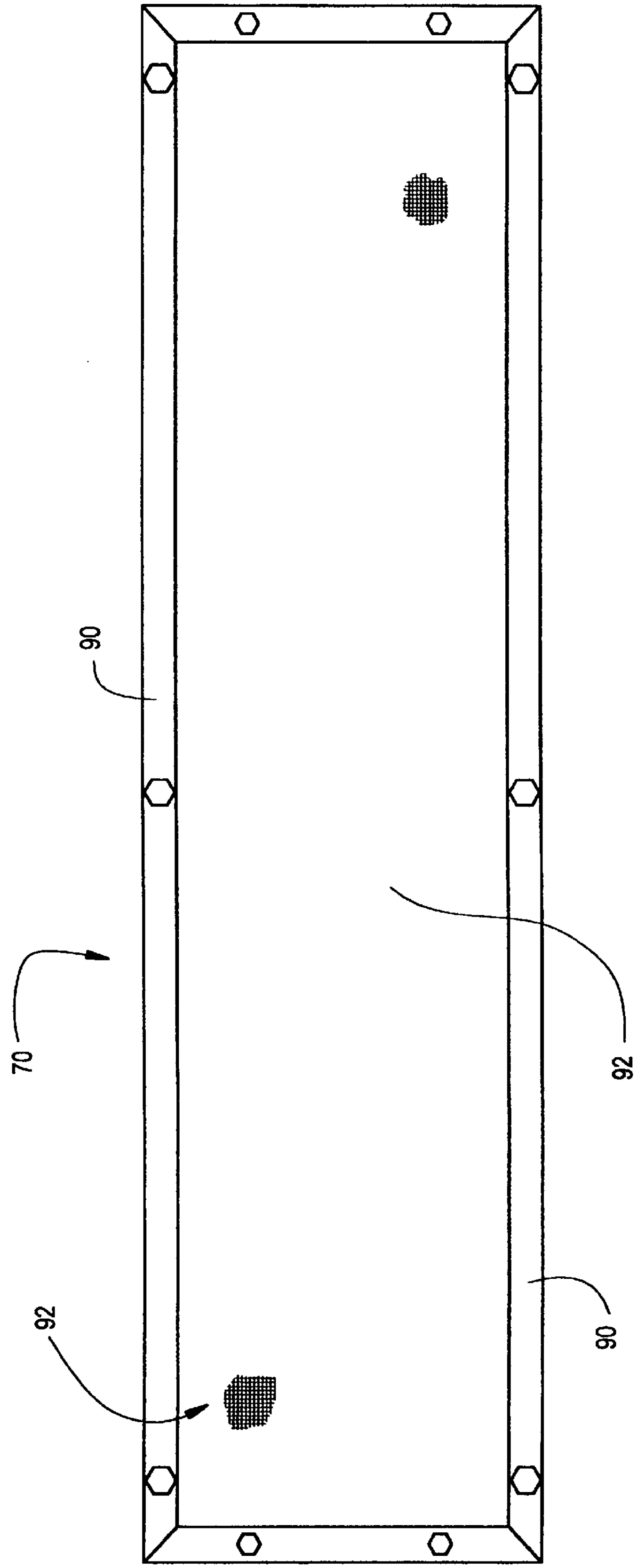
FIG. 7 is a top view of the top wall of the collector device of FIGS. 4–6.
Figure 8:
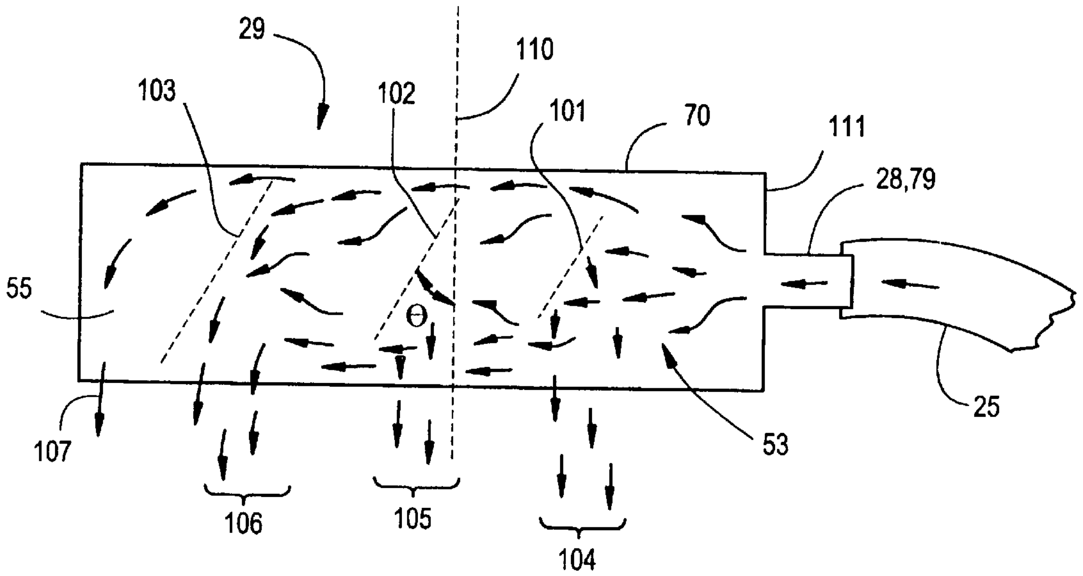
FIGS. 8 and 9 are side elevation views of the collector box with different baffle systems disposed therein according to certain embodiments of this invention.

While the inventive baffle system of this invention is most clearly illustrated in FIGS. 8(*a*)–8(*b*), FIGS. 1–5 and 7 illustrate the surrounding componentry used in conjunction therewith. FIGS. 1–2 illustrate user 3 blowing a loose-fill insulation/dry adhesive mixture 4 together with an adhesive activating liquid (e.g., water) into vertically extending open wall cavity 5 according to an embodiment of this invention. As shown, a dry mixture of loose-fill insulation fibers (e.g., fiberglass or cellulose) and dry adhesive (e.g., dry redispersible powder adhesive such as RP 238 available from Air Products) is blown through hose 7 from the outlet of fiber hopper 9 toward nozzle 11. Near or proximate spray nozzle 11, the dry insulation/adhesive mixture is hit with water from hose 13. The insulation/adhesive mixture 4 is blown together with the adhesive activating water into open wall cavity 5. A substantial portion of the blown mixture is retained in the vertically extending cavity, while another smaller portion 15 of the mixture falls to the floor 14 proximate the cavity, or is scrubbed off of the insulated cavity during touch-up (e.g., via a belt driven rotary scrubber) and falls onto the floor 14. This smaller portion (e.g., overspray) is recycled back to the collector device 29 that includes the inventive baffle system according to this invention (see FIGS. 8–9).

FIG. 2 illustrates a pair of insulated wall cavities 17, numerous open cavities 19 not yet insulated, and open wall cavity 5 in the process of being insulated. Each of these open cavities is vertically extending and is defined between a pair of elongated studs (wooden or metal) 21 within the residential dwelling. Vertically extending studs 21 are supported by elongated horizontal studs 23. After the cavities are insulated and excess insulation is scrubbed off to make the exterior insulation surface flush with the studs (e.g., see cavities 17), the cavities are closed by attaching drywall or wall board to the studs over the insulation in a known manner. Please note that the back sides of wall cavities 5, 17, and 19 are closed via exterior weather siding, sheathing, plywood, or the like 18. Sheathing, plywood, or the like 18 is attached via nails or screws to the other side of studs 21 and 23, and functions to support the fiber as it is blown into the cavity (i.e., the rear surface 18 of each open wall cavity prevents the blown/sprayed fiber from exiting the rear of the cavity during application).

Figure 3:
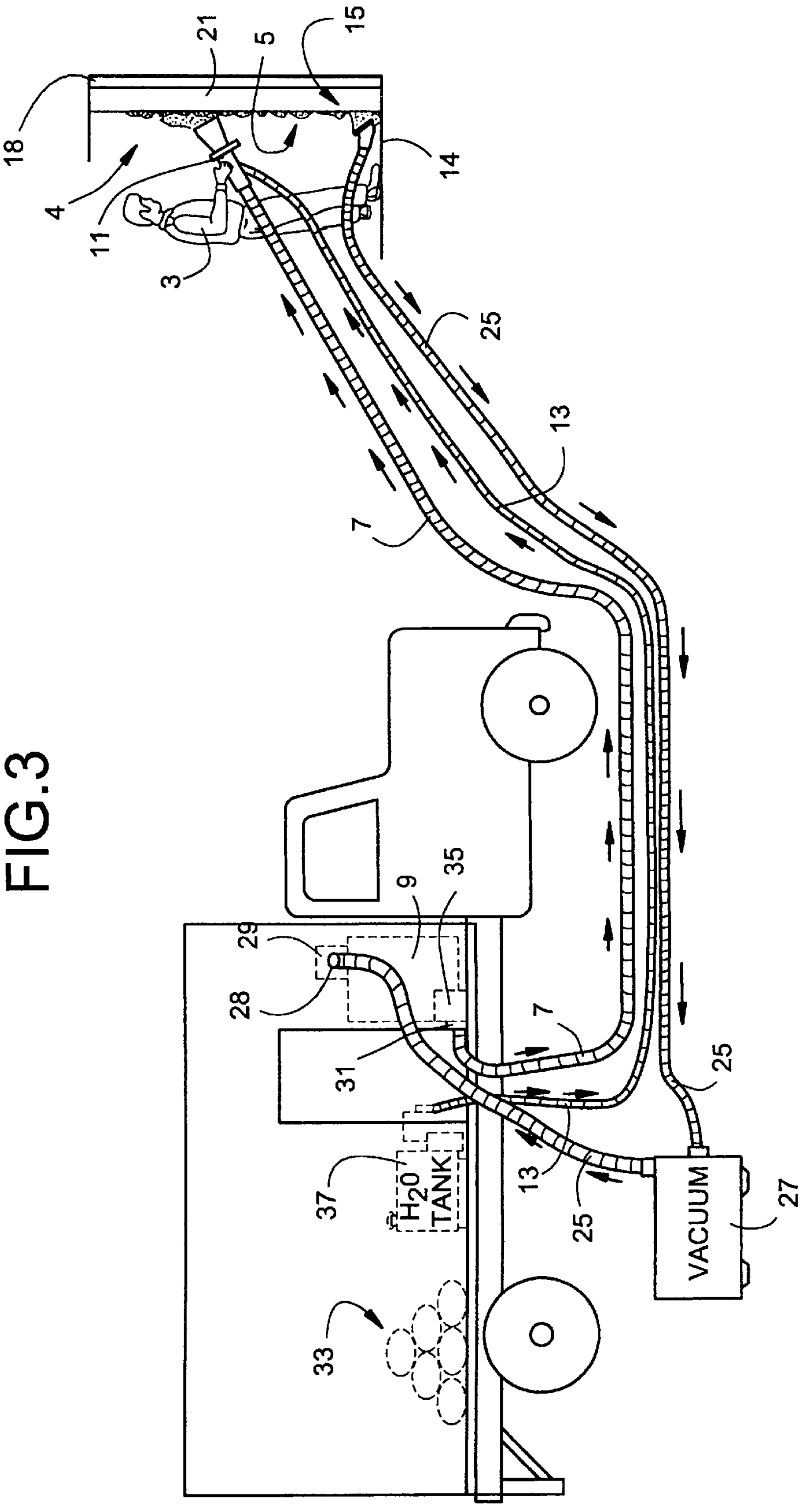
FIG. 3 is a schematic illustrating an insulation blowing/spraying system.

Attention is now directed to the fiber recovery or recycling subsystem as shown in FIGS. 1–5 and 7–9. This recycling subsystem includes return hose or tube 25, vacuum 27 for sucking up waste or scrubbed off fibers 15 from the floor 14 of the dwelling, and collector device 29 (e.g., collector box) mounted vertically above hopper 9. According to this invention, the collector device includes a unique baffle system illustrated in detail in FIGS. 8(*a*)–8(*b*) which functions to more evenly and uniformly distribute the recycled fibers than in the prior art. Collector device 29 is mounted at an elevation vertically above, and over top of, the open input of fiber hopper 9. According to certain embodiments, collection box or device 29 may be mounted directly to the top of hopper 9 via rigid brackets 30. Vacuum 27, or an equivalent vacuuming cyclone separator or other suction device, may be located exterior the truck as shown in FIGS. 1 and 3, or alternatively may be located inside of the vehicle proximate collector device 29 and hopper 9.

Vacuum 27 causes waste or overspray fibers 15 to be sucked into return hose 25 and be directed back toward the vacuum and hopper 9. From the return hose 25, the recovered insulation fibers (e.g., fiberglass or cellulose) are received in cavity 53 (see FIG. 4) defined within the housing of collector device 29. Once in cavity 53, the recovered fibers are evenly distributed by the baffle system of FIG. 8 or 9 and fall downward due to gravity through an output hole(s) or aperture(s) in the bottom of collector device 29 and back into hopper 9 where the recycled fibers from device 29 intermix with virgin fiber/adhesive mixture. Hopper 9 has an open top. The mix of recycled and virgin insulation/adhesive in hopper 9 is then forwarded through airlock 31 into blow hose 7 and forwarded toward the cavity or cavities (5,17, and 19) to be insulated. Attic areas may also be insulated using this system.

Referring to FIGS. 1–5 and 7–9, a typical operation utilizing fiberglass insulation will now be described. First, storage area 33 within the vehicle is filled or loaded with bales or bags of virgin fiberglass insulation mixed with dry redispersible powder adhesive. An operator fills up hopper 9 with dry virgin insulation/adhesive mixture from the bags or bales taken from storage 33. The virgin mixture from the hopper 9 is metered into blowing tube or hose 7 by way of airlock 31. Once in hose/tube 7, blower or fan 35 causes the mixture to be forwarded or carried by air through the hose 7 toward nozzle 11. Meanwhile, an adhesive activating liquid, such as water, is supplied from source 37 into hose 13, and is forwarded through liquid hose 13 toward nozzle 11. Proximate nozzle 11, the influx of water under pressure from hose 13 mixes with the fiber/adhesive mixture from hose 7, and together they are blown/sprayed into vertically extending open wall cavity 5. The water may contact the dry mixture either exterior the nozzle and hoses, or alternatively inside of the nozzle or hose housing proximate the outlet.

The adhesive, having been activated by the water from hose 13, causes a significant portion of the blown fiberglass mixture 14 to be retained within cavity 5 while a smaller portion is not retained and falls to the floor 14. After a number of open wall cavities have been filled with the fiberglass, a conventional powered scrubber is used to scrub off overspray, which also falls to the floor. Thus, waste fibers 15 include fibers that were not originally retained within the cavity at which they were directed and/or fibers that have been scrubbed off in order to make the outer insulated cavity surface flush with the exterior surfaces of studs 21 and 23 (e.g., see cavities 17).

Once a sizeable amount or pile of waste insulation 15 accumulates on the floor of the dwelling, it is time to recycle same. Vacuum 27 is turned on and the waste fibers 15 are sucked into an end of return hose 25 and forwarded to inlet 28 (i.e. nozzle 79 illustrated in FIGS. 5–6 and 8) of collector device 29. A portion of the air that is blown through hose 25 for carrying the recovered waste fibers is permitted to exhaust out of the top of collector device 29 as shown in FIG. 1 at 32 so as to reduce turbulent air flow within hopper 9. While some of this air is exhausted at 32 through the top of device 29, another portion of the air flows through cavity 53 and then downward toward hopper 9 along with the recycled fibers. The recovered from hose 25 fibers pass through inlet 28 and into cavity 53 defined within the housing of device 29, where they are substantially evenly distributed by the baffles shown in FIGS. 8 and 9 and fall 39 evenly back into hopper 9. Once back in hopper 9, the recovered or recycled fibers mix with virgin fibers, and are together (along with the adhesive) metered into hose 7 via airlock 31 and blown back toward a wall cavity (or attic) to be insulated. While the system and method of this invention are especially adapted for blowing dry fiber/adhesive mixture together with an adhesive activating liquid into open wall cavities, the system and method may also be utilized for blowing loose-fill insulation into closed cavities or into attics (and recycling overspray or the like). Furthermore, the system may be used to blow a mixture of loose-fill insulation together with a wet adhesive carrying spray into open or closed wall cavities (or attics).

FIG. 3, in addition to FIG. 1, is another schematic of the insulation blowing or spraying system. As illustrated, the system in FIG. 3 includes fiber blowing hose 7, water hose 13, return hose 25 for conveying waste fibers 15, conventional vacuum 27 for causing the waste fibers 15 to be sucked into hose 25 and returned to hopper 9, water tank/supply 37, loose-fill fiber storage area 33 for housing bags of virgin fiberglass/dry adhesive mixture, blower 35 for causing the dry fiberglass/adhesive mixture from hopper 9 to be blown through hose 7 toward the wall cavity to be insulated, and finally collector device 29 mounted on top of hopper 9 for receiving the waste fibers from hose 25 and redistributing same back into the hopper. As illustrated, hopper 9, collector device 29, virgin insulation storage area 33, blower 35, and water tank 37 may all be mounted on the wheeled vehicle. Vacuum 27 may either be mounted on the vehicle, or be placed on the ground or inside the dwelling exterior of the vehicle.

Figure 4:
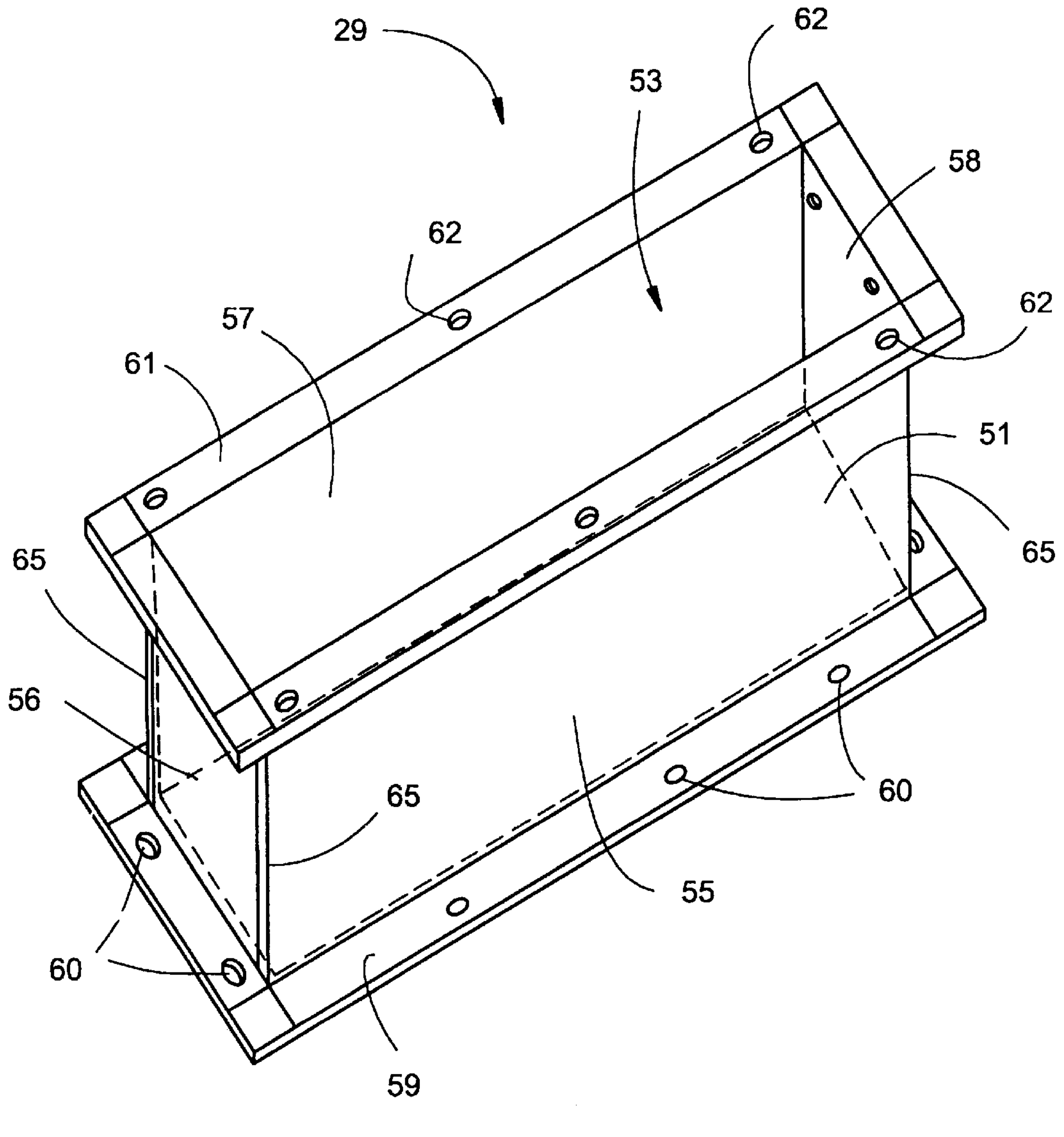
FIG. 4 is a perspective view illustrating a collector box device adapted to be mounted at an elevation above the hopper so as to receive the waste fibers from the vacuum system and redistribute same back into the main hopper.

FIG. 4 is a perspective view of collector device 29 (absent the baffle system) which is to be mounted on top of and at an elevation above hopper 9, this view of device 29 also not including the top wall or screen which will be described hereinafter. As shown in FIG. 4, device 29 is hollow and includes a substantially continuous sidewall 51 that defines and laterally surrounds fiber recovery cavity 53 in which the FIG. 8 and 9 baffles 101–103 are disposed. Substantially continuous sidewall 51 may be rectangular in shape as shown in the FIG. 4 embodiment, so as to include four separate sidewall sections 55, 56, 57, and 58, respectively. Sidewall sections 55 and 57 are substantially parallel to one another, defining hollow cavity 53 therebetween, while sidewall sections 56 and 58 are also substantially parallel to one another. As shown, in this particular embodiment, sidewall sections 55 and 57 of substantially continuous side wall 51 are longer in length than sections 56 and 58. The four separate wall sections 55–58 may be formed of a singular metal sheet bent at the corners 65, or alternatively may be formed from four separate metal sheets welded together at corner areas 65, or alternatively may be formed of molded plastic. Instead of the rectangular shape illustrated in FIGS. 4–9, collector device 29 may alternatively be oval shaped, circular, triangular, etc., provided that there is a collection cavity having the baffles 101–103 that receive and redistribute the waste or recycled fibers 15 as they fall or flow back into the main hopper 9.

Collector device 29 is mounted at an elevation above, and preferably over top of, hopper 9. Adjacent the bottom of device 29 is provided flange 59 that rims the periphery of the device. Flange 59 includes a plurality of mounting apertures 60 defined therein which allow device 29 to be mounted to the top of the hopper via metal brackets or the like. In a similar manner, adjacent the top of device 29 is located another peripheral flange 61 which includes a plurality of apertures 62 defined therein. Flange 61 in conjunction with apertures 62 permit top wall 70 (see FIG. 7) to be mounted to the top of device 29. The purpose of top wall 70 is twofold. Firstly, it prevents the waste fibers 15 entering into cavity 53 from blowing out of the top of device 29. Secondly, the top wall preferably includes at least one exhaust aperture defined therein for the purpose of allowing air from the return hose 25 to exhaust therefrom so as to reduce turbulence in hopper 9.

Device 29 illustrated in FIG. 4 (not including the top wall) is made from four separate aluminum sheets (about 0.063 inches thick each), each of which ends up corresponding to one of the sidewall sections 55, 56, 57, and 58, and its respective upper and lower flanges. For example, two metal sheets of identical size are provided, one for making up sidewall section 55 and the other for sidewall section 57. The respective ends of each of these two sheets are bent for the purpose of forming the lower and upper flange sections 59 and 61, respectively. In a similar manner, a pair of smaller metal sheets are provided which end up defining sidewall sections 56 and 58. The ends of each of these two sections are also bent for the purpose of forming the lower and upper flange sections. Following the sizing of the four sidewall sections, the forming of apertures therein, and the bending of the ends thereof for defining the flange sections, the four sections are welded together at corner areas 65 (e.g., via spot welding) so as to form the device 29 shown in FIG. 4. The top wall is then affixed to the top of device 29 via apertures 62.

Figure 5:
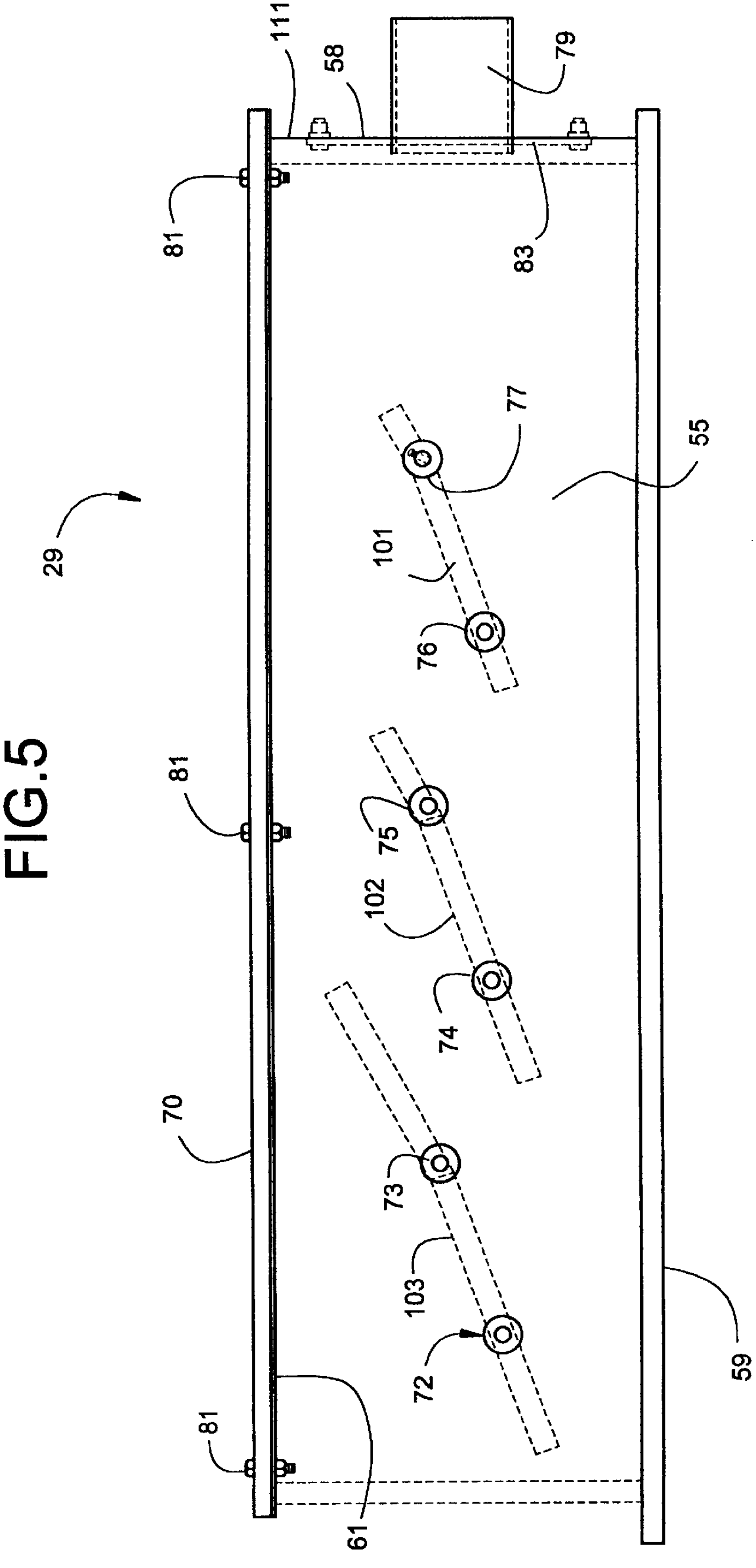
FIG. 5 is a side elevational view of the collector device of FIG. 4.

FIGS. 5, 7, 8, and 9 illustrate collector device 29 from different view points. FIG. 5 is a side view of collector device 29, this view clearly illustrating sidewall section 55, bottom flange 59, top flange 61, top wall 70 mounted to the top of the device via flange 61, the ends of a plurality of mounting members 72–77 attached to sidewall sections 55 and 57 for supporting the baffles (FIGS. 8 and 9 in the box cavity, and waste fiber inlet nozzle 79 that is affixed to device 29 at sidewall section 58. Top wall 70 is attached to upper flange 61 via fasteners (e.g., bolts and corresponding washers/nuts) 81 that extend through apertures 62.

Figure 9:
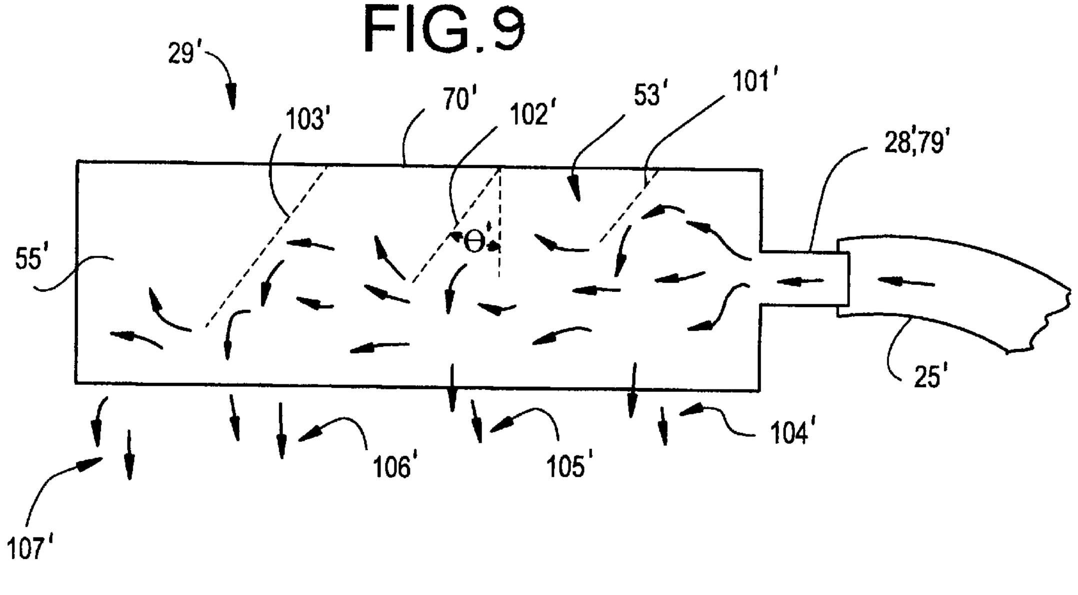

Mounting members 72, 74, and 76 are located at elevations lower than the elevations of members 73, 75, and 77 so as to allow the baffles to be mounted at angles relative to the vertical in the cavity 53 as shown in FIGS. 8 and 9.

Figure 6:
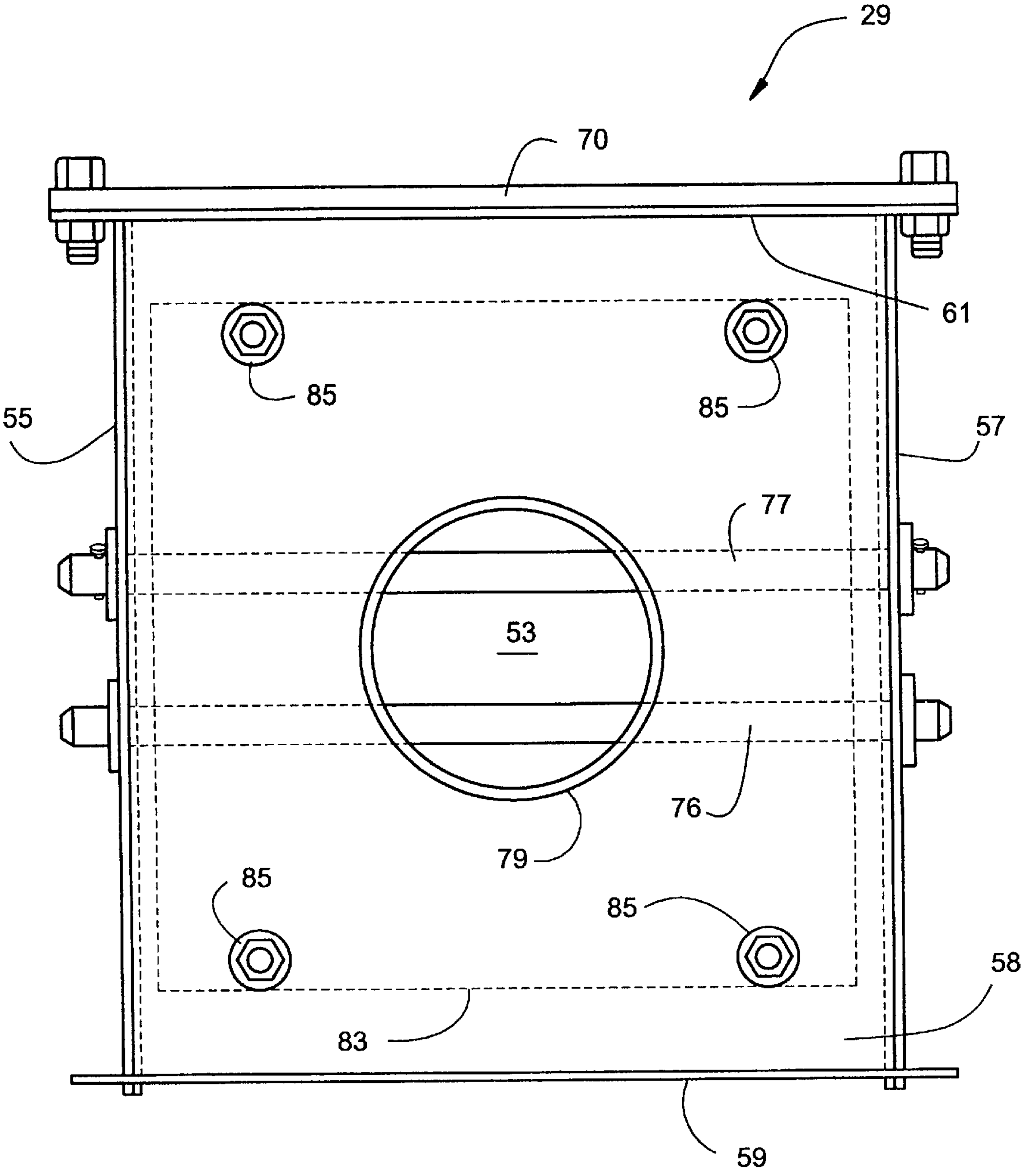
FIG. 6 is an end view of the collector device of FIGS. 4–5, this view illustrating the device from the end which includes the inlet nozzle.

FIG. 6 is an end view of a device as disclosed in commonly owned Ser. No. 08/805,729. As shown in FIG. 6, annular nozzle 79 that extends outwardly from sidewall section 58 is connected to (e.g., welded) substantially planar metallic mounting section 83. Thus, the nozzle assembly, including sections 79 and 83, is mounted to sidewall section 58 by first locating the entire nozzle assembly within cavity 53 and then feeding annular nozzle 79 outwardly through a corresponding hole defined in sidewall section 58 until nozzle 79 protrudes outwardly from section 58 and substantially planar mounting section 83 comes to rest against the interior flat surface of section 58. Thereafter, the nozzle assembly (79 and 83) is affixed to sidewall section 58 via fasteners 85. As discussed above, the FIGS. 8 and 9 box baffle design has surprisingly been found to result in improved fiber distribution as compared to the FIG. 6 design of Ser. No. 08/805,729.

When the waste fibers along with the adhesive they are mixed with are blown through hose 25 toward collector device 29, they enter into cavity 53 via nozzle inlet 79. As the waste fibers (that are sometimes wet due to the water that is applied to them at nozzle 11) enter into cavity 53, a substantial number of the waste fibers contact the FIG. 8, 9 baffles 101–103 or 101'–103' respectively. As a result, the waste or recycled fibers within cavity 53 are more evenly distributed throughout the interior of the cavity and fall from cavity 53 directly into the open top end of hopper 9 in a more even manner.

Device 29 includes no bottom wall other than flange 59. Thus, the bottom of cavity 53 is open. Alternatively, a bottom wall may be affixed to flange 59, such a bottom wall including a plurality of large apertures defined therein for allowing the waste fibers to drop from device 29 into hopper 9.

Sidewall sections 55 and 57 may be approximately 47 inches in length, and about twelve inches in height. Sidewall sections 56 and 58 may be approximately 10⅝ inches wide, and about twelve inches in height. Also, nozzle 79 may protrude approximately four inches from sidewall 58, and the nozzle may have a diameter of about four inches.

FIG. 7 is a top view of top wall 70 adapted to be attached to flange 61. As illustrated, top wall 70 includes frame 90 that extends around the periphery of the top wall and supports screen 92. In this particular embodiment, the entire area interior of frame 90 is made up of screen 92. As discussed above, the screen section of the top wall 70 prevents the waste fibers from escaping cavity 53 through the top, and also allows air that is blown into cavity 53 from return hose 25 to exhaust upwardly away from hopper 9. This helps to reduce turbulent airflow within hopper 9, thereby keeping the fibers within the hopper and keeping dust to a minimum. According to certain embodiments, top wall 70 may be approximately 48.5 inches long from end to end, approximately 12.0 inches wide, and aluminum frame 90 of the top wall approximately $\frac{5}{16}$ inch thick.

According to alternative embodiments of this invention, the screen section of top wall 70 may be replaced with a more rigid section that includes a plurality of air exhaust apertures defined therein. For example, screen section 92 may be replaced with a molded plastic section which includes a plurality of tiny apertures defined therein for both preventing the fibers from escaping the cavity and also allowing the air from the return hose to exhaust therethrough. Optionally, exhaust apertures may be provided in sidewall 51 of device 29, instead of or in addition to the exhaust apertures in the top wall.

FIGS. 8 and 9 are schematic/side elevational views of collector device 29 according to certain embodiments of this invention. For convenience, in FIG. 9, analogous parts to those in FIG. 8 are similarly numbered, but with an apostrophe after the number (e.g. θ', 29', 25', 28', 53', 55', 70', 79', 101', 102'–107', etc.). As illustrated in FIGS. 8 and 9, collector device 29 includes a plurality of angled or inclined baffles 101–103 rigidly affixed to the device and extending across the width of inner cavity 53 thereof for the purpose of evenly distributing incoming recycled fiberglass, plastic, or cellulose fibers so that same fall through the open bottom of device 29 and into the hopper described above in a more uniform manner. Surprisingly, the instant inventor has found that the provision of baffles 101–103 in the collector box results in improved fiber distribution (with respect to a more even and uniform distribution) when compared to the box design disclosed in Ser. No. 08/805,729. Light gauge aluminum plate is a suitable material for the baffles.

Still referring to FIGS. 5, 8 and 9, baffles 101–103 are mounted to the box via mounting members 72–77 (e.g., mounting members of FIG. 5). In FIG. 8, for example, mounting members 76 and 77 would be used to mount baffle 101 to each of the two opposing sidewalls so that the baffle extends across the entire width of the inner cavity of device 29 from sidewall 55 to sidewall 57. Likewise, mounting members 74–75 would be used to mount baffle 102 to the sidewalls, and mounting members 72–73 would be used to mount baffle 103 to the opposing sidewalls of collector device 29.

As shown in FIG. 8, the baffles increase in size/dimension along the flow of the incoming fibers from the smallest baffle 101, to intermediate baffle 102, to the largest baffle 103. This increase in size of the baffles allows a first portion of fiber 104 to be directed downward by baffle 101, a second portion of fiber 105 (which has bypassed baffle 101) to be directed downward by baffle 102, a third portion 106 of fiber (which bypassed baffles 101–102) to be directed downward by baffle 103, and finally the rear wall of collector device 29 directing portion 107 of fiber downward through the open bottom wall of device 29. Fiber portions 104–107 fall into hopper 9 as shown in FIG. 1.

Each of baffles 101–103 in FIG. 8 is mounted at an angle θ relative to the vertical 110 for the purpose of efficiently directing the fibers downward toward hopper 9. Angle(s) θ may be from about 0°–60° according to certain embodiments of this invention, preferably from about 20°–45°, and most preferably from about 30°–40°, relative to the vertical 110 as shown in FIG. 8. In certain embodiments, all baffles 101–103 are mounted at the same anglee relative to the vertical, while in other embodiments all of the baffles 101–103 are oriented or inclined at different angles e relative to the vertical. The baffles are angled such that their lower edges are disposed further from the inlet nozzle than their corresponding upper edges.

A typical operation of collector box 29 and the baffle system of FIG. 8 will now be described. Firstly, the fibers to be recycled (e.g., fiberglass, plastic fiber, or cellulose) flow into the device through inlet 28, 79. A first portion 104 of these fibers are directed downward (e.g., by contact or air flow) by first baffle 101 and into the hopper, while second portion 105, third portion 106, and fourth portion 107 of the fibers make their way through device 29 beyond the first baffle. The second portion 105 of fibers is directed downward by baffle 102 into hopper 9, while the third and fourth portions 106 and 107, respectively, make their way through the device 29 beyond the second baffle. Third baffle 103 directs third portion 106 of fibers downward toward the hopper, while the rear wall of device 29 causes the final or remaining portion 107 of fibers to be directed into the hopper. In such a manner, baffles 101–103, in combination with the rear wall of device 29, evenly distribute the recycled fibers into the hopper 9 located vertically beneath device 29.

In the FIG. 8 embodiment, the upper edge of baffle 101 is at a vertical elevation lower than the upper edge of baffles 102 and 103. The upper edge of baffle 102 is vertically lower than the upper edge of baffle 103 and higher than the upper edge of baffle 101. The lower edges of baffles 101–103 are oriented in the same symetric manner, such that the edges (upper and/or lower) of the baffles extend further vertically throughout the flow path of the fibers through cavity 53 so as to cover more surface area through the flow path.

With regard to dimensions according to one embodiment, when device 29 is 60 inches long from end to end (exclusive of nozzle 79), the top edge of baffle 101 is located 18" (inches) from end wall 111 and 5" from the top wall 70 of device 29. Meanwhile, the lower edge of baffle 101 is located 24" from end wall 111 and 4½" from the bottom edge of device 29. With regard to baffle 102, the top edge of baffle 102 is located 31" from end wall 111 and 3½" from the top wall 70 of device 29, while the bottom edge of baffle 102 is located 36" from end wall 111 and 2½" from the bottom edge of the collector device 29. The top edge of baffle 103 in this embodiment is located 42" from end wall 111 and 2½" from the top wall 70 of device 29, while the bottom edge of baffle 103 is located 48" from end wall 111 and 1" from the bottom edge of the collector box. These dimensions are, of course, variable according to different embodiments of this invention as will be recognized by those of skill in the art.

FIG. 9 illustrates another embodiment of this invention, wherein baffles 101–103 all have their top edges mounted on a substantially common plane adjacent the top wall 70 of collector box/device 29. Therefore, the second; third, and fourth portions of fiber 105–107 which make their way beyond baffle 101 in the box do so at elevations beneath the lower edge of the first baffle 101. This, of course, is also the case with regard to baffles 102 and 103.

Baffles 101–103 are rigid metal (e.g., aluminum sheet) members in certain embodiments, and substantially planar, while they may be curved and/or flexible in other embodiments. Furthermore, the number of baffles may vary according to different embodiments (e.g., one, two, three, four, five, or more baffles may be provided at different locations within the cavity in different embodiments).

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A system for blowing loose-fill insulation into wall cavities, the system comprising:

a hopper for receiving virgin insulation fibers;

means for introducing the virgin fibers from said hopper into a blowing hose;

means for blowing the virgin fibers through said blowing hose and out of a nozzle into wall cavities to be insulated with the loose-fill insulation;

fiber recovery means, including a vacuum operatively associated with a return hose, for recovering waste insulation fibers and conveying the waste fibers back toward said hopper via said return hose; and collector means including a housing and a plurality of fiber distributing baffles mounted therein, said collector means being mounted at an elevation vertically above said hopper for receiving the waste fibers from said fiber recovery means and distributing said waste fibers back into said hopper so that the waste fibers fall from said collector means back into said hopper, wherein said plurality of baffles are of different sizes and are inclined relative to vertical so as to more evenly and uniformly distribute the waste fibers back into said hopper.

2. The system of claim 1, wherein said plurality of fiber distributing baffles includes first, second, and third baffles provided in said housing, and wherein said first baffle is closest to a waste fiber inlet of said housing, and wherein said second and third baffles extend vertically to greater degrees than does said first baffle.

3. The system of claim 2, wherein said second and third baffles extend vertically downwardly a greater amount than does said first baffle, and wherein each of said first, second, and third baffles are oriented at an angle of from about 20°–45° relative to the vertical so as to provide improved fiber distribution.

4. The system of claim 3, wherein said insulation fibers include fiberglass mixed with a dry adhesive, and said blowing means blows said fiberglass and said dry adhesive together with an adhesive activating liquid into the cavities.

5. The system of claim 3, wherein said blowing means includes a blower operatively associated with said blowing hose for causing the virgin and said waste fibers to be blown through said blowing hose toward and into the cavities.

6. The system of claim 1, wherein said housing has at least one large aperture or void in a bottom, thereof for allowing the waste fibers to fall from the collector means into said hopper.

7. The system of claim 1, wherein said collector means further includes substantially continuous sidewall means for laterally surrounding and encompassing an interior cavity of said collector means.

8. The system of claim 1, wherein said collector means is substantially rectangular in shape so as to include four separate sidewall sections, two of which are substantially parallel to one another.

9. A fiber recovery and distribution device for use in an insulation blowing system that includes a fiber recovery or recycling subsystem, the fiber recovery and distribution device comprising:

substantially continuous sidewall means for defining and laterally surrounding an interior fiber recovery cavity;

fiber inlet means defined in said sidewall means for receiving recovered insulation fibers from a return and allowing the recovered fibers to flow into said cavity;

a top wall disposed adjacent an upper edge of said sidewall means, said top wall including aperture means defined therein for enabling air flowing into said cavity to at least partially exhaust upward through the aperture means;

a plurality of baffles mounted to said device and extending across said cavity at different locations for evenly distributing the recovered fibers downward toward a hopper after the recovered fibers enter the cavity through the inlet means; and outlet means located proximate a bottom of the device for allowing the recovered fibers to fall from said cavity downward toward and into the hopper where the recovered fibers can intermix with virgin fibers;

wherein said baffles increase in surface area as a function of increased distance from the inlet means so that baffles farther from the inlet means define more surface area than baffles closer to the inlet means.

10. The device of claim 9, wherein said sidewall means is rectangular in shape and includes four separate wall sections, two of said four wall sections being substantially parallel to one another.

11. The device of claim 10 wherein said aperture means in said top wall includes a screen for preventing said recovered fibers from blowing past said screen and allowing the air to exhaust through said screen.

* * * * *

UNITED STATES PATENT AND TRADEMARK OFFICE

CERTIFICATE OF CORRECTION

PATENT NO. : 5,984,590
DATED : Nov. 16, 1999
INVENTOR(S) : Joseph Thomas Church and C. E. Butch Lytle It is certified that error appears in the above-identified patent and that said Letters Patent is hereby corrected as shown below:

On title page, Item [19] and Item [75], delete "II" after "Church", the last name of the first listed inventor.

Column 3, line 60, delete "8(a)-8(b)" after "FIGS." and substitute -- 8-9 --.

Column 4, line 41, delete "8(a)-8(b)" after "FIGS." and substitute -- 8-9 --.

Column 7, line 15, insert parenthesis -- ) -- after "9".

Column 9, line 6, delete "anglee" after "same" and substitute -- angle --;
line 8, delete "e" after "angles" and subsitute -- --.

Signed and Sealed this

Fourth Day of July, 2000

Attest:

Q. TODD DICKINSON

Attesting Officer

Director of Patents and Trademarks